United States Patent
Nose et al.

(10) Patent No.: US 11,608,791 B2
(45) Date of Patent: Mar. 21, 2023

(54) CONTROL DEVICE FOR VEHICLE

(71) Applicant: TOYOTA JIDOSHA KABUSHIKI KAISHA, Aichi-ken (JP)

(72) Inventors: Yuki Nose, Nagoya (JP); Yuto Ikeda, Okazaki (JP); Takanobu Gotoh, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/702,791

(22) Filed: Mar. 24, 2022

(65) Prior Publication Data
US 2022/0307437 A1    Sep. 29, 2022

(30) Foreign Application Priority Data
Mar. 26, 2021 (JP) ............... JP2021-053934

(51) Int. Cl.
F02D 41/02    (2006.01)
F02D 41/12    (2006.01)
F16H 61/14    (2006.01)

(52) U.S. Cl.
CPC ......... *F02D 41/022* (2013.01); *F02D 41/126* (2013.01); *F16H 61/143* (2013.01); *F02D 2200/602* (2013.01); *F02D 2200/701* (2013.01); *F02D 2400/12* (2013.01)

(58) Field of Classification Search
CPC .. F02D 41/0087; F02D 41/022; F02D 41/126; F02D 2200/602; F02D 2200/701; F02D 2400/12; B60W 10/023; B60W 10/024; F16H 61/143
See application file for complete search history.

(56) References Cited

U.S. PATENT DOCUMENTS

| | | | | |
|---|---|---|---|---|
| 7,651,441 | B2* | 1/2010 | Maguire | B60W 30/186 477/181 |
| 7,785,230 | B2* | 8/2010 | Gibson | F16H 61/143 477/62 |
| 7,941,994 | B2* | 5/2011 | Surnilla | F01N 13/107 60/299 |
| 8,052,575 | B2* | 11/2011 | Albertson | B60W 30/20 477/98 |
| 9,050,964 | B2* | 6/2015 | Tohta | B60W 10/026 |
| 2007/0243971 | A1* | 10/2007 | Brevick | F16H 61/143 477/70 |

(Continued)

FOREIGN PATENT DOCUMENTS

JP    H5-96978 A    4/1993

*Primary Examiner* — Phutthiwat Wongwian
*Assistant Examiner* — Arnold Castro
(74) *Attorney, Agent, or Firm* — Hauptman Ham, LLP

(57) ABSTRACT

A CPU of a control device is configured to perform a specific cylinder fuel cutoff process of causing an internal combustion engine to operate such that supply of fuel to some cylinders out of a plurality of cylinders is stopped and supply of fuel to the other cylinders is maintained and a fastening force decreasing process of decreasing a fastening force of a lockup clutch of a torque converter. The CPU is configured to start the specific cylinder fuel cutoff process in a state in which the fastening force has been decreased through the fastening force decreasing process when the specific cylinder fuel cutoff process is performed in a state in which the internal combustion engine operates with a load.

7 Claims, 4 Drawing Sheets

(56) References Cited

U.S. PATENT DOCUMENTS

| | | | |
|---|---|---|---|
| 2010/0235062 A1* | 9/2010 | Moriya | F16H 61/143 701/68 |
| 2011/0030657 A1* | 2/2011 | Tripathi | F02D 41/0087 123/481 |
| 2014/0365092 A1* | 12/2014 | Kawamoto | F02D 41/023 701/54 |
| 2014/0373809 A1* | 12/2014 | Kawamoto | F02D 41/12 123/332 |
| 2020/0240343 A1* | 7/2020 | Iwasaki | F16H 61/143 |

* cited by examiner

CONTROL DEVICE FOR VEHICLE

CROSS-REFERENCE TO RELATED APPLICATION

This application claims priority to Japanese Patent Application No. 2021-053934 filed on Mar. 26, 2021, incorporated herein by reference in its entirety.

BACKGROUND

1. Technical Field

The present disclosure relates to a control device for a vehicle that is applied to a vehicle which includes an internal combustion engine including a plurality of cylinders and a torque converter including a lockup clutch.

2. Description of Related Art

An example of a control device for a vehicle that performs a specific cylinder fuel cutoff process of stopping supply of fuel to only one cylinder out of a plurality of cylinders when an operation state of an internal combustion engine is included in a specific decelerating operation area is described in Japanese Unexamined Patent Application Publication No. 5-96978 (JP 5-96978 A).

SUMMARY

Recently, a control device for a vehicle that performs a specific cylinder fuel cutoff process when an internal combustion engine operates with a load has been developed. When the specific cylinder fuel cutoff process is being performed, the internal combustion engine operates in a state in which supply of fuel to some cylinders out of a plurality of cylinders is stopped and supply of fuel to the other cylinders is maintained. Accordingly, an output torque of the internal combustion engine fluctuates. As a result, when the internal combustion engine operates with a load, the amplitude of fluctuation of the output torque of the internal combustion engine due to execution of the specific cylinder fuel cutoff process is large and thus there is concern about a vehicle body vibrating heavily.

According to an aspect of the present disclosure, there is provided a control device for a vehicle that is applied to a vehicle which includes an internal combustion engine including a plurality of cylinders, a torque converter including a lockup clutch, and a gear shift device. The control device includes an execution device configured to perform a specific cylinder fuel cutoff process of stopping supply of fuel to some cylinders out of the plurality of cylinders and maintaining supply of fuel to the other cylinders to operate the internal combustion engine and a fastening force decreasing process of decreasing a fastening force of the lockup clutch. The execution device is configured to start the specific cylinder fuel cutoff process in a state in which the fastening force has been decreased through the fastening force decreasing process when the specific cylinder fuel cutoff process is performed in a state in which the internal combustion engine operates with a load.

With this configuration, when the specific cylinder fuel cutoff process is performed when the internal combustion engine operates with a load, the fastening force decreasing process is performed before the specific cylinder fuel cutoff process is performed. When the fastening force decreasing process is performed, the fastening force of the lockup clutch is decreased. As a result, in comparison with before the fastening force is decreased, efficiency of torque transmission from the internal combustion engine to the gear shift device is lowered. As a result, even when an output torque of the internal combustion engine fluctuates due to execution of the specific cylinder fuel cutoff process, the fluctuation is attenuated and transmitted to the gear shift device. Accordingly, when the specific cylinder fuel cutoff process is performed in a state in which the internal combustion engine is operating with a load, it is possible to curb vibration of a vehicle body of the vehicle.

In the control device for a vehicle according to the aspect, the execution device may be configured to perform the specific cylinder fuel cutoff process when an operation state of the internal combustion engine is included in a predetermined permitted operation area in a state in which the fastening force has been decreased through the fastening force decreasing process.

With this configuration, when the operation state of the internal combustion engine is included in the permitted operation area in a state in which the fastening force of the lockup clutch has been decreased through the fastening force decreasing process, the specific cylinder fuel cutoff process is performed.

In the control device for a vehicle according to the aspect, an area with a high engine rotation speed and with a low engine load factor in the permitted operation area may be set as a specific area. In this case, the execution device may be configured to start the specific cylinder fuel cutoff process without performing the fastening force decreasing process based on the premise that the operation state of the internal combustion engine is included in the specific area in a state in which decreasing the fastening force of the lockup clutch is prohibited.

When the internal combustion engine is operating with a load and when the engine rotation speed is relatively high and the engine load factor is low, the vehicle body is less likely to vibrate even if the output torque of the internal combustion engine fluctuates. Accordingly, with this configuration, when decreasing the fastening force of the lockup clutch is prohibited and the operation state of the internal combustion engine is included in the specific area, the specific cylinder fuel cutoff process can be performed. As a result, it is possible to increase opportunities to perform the specific cylinder fuel cutoff process while curbing vibration of the vehicle body due to execution of the specific cylinder fuel cutoff process.

With this configuration, when the operation state of the internal combustion engine is not included in the specific area in a state in which decreasing the fastening force of the lockup clutch is prohibited, the specific cylinder fuel cutoff process is not performed.

In the control device for a vehicle according to the aspect, when the fastening force decreasing process is defined as a first fastening force decreasing process, the execution device may be able to perform a second fastening force decreasing process of decreasing the fastening force at a rate of decrease of the fastening force which is lower than that in the first fastening force decreasing process. An area with a high engine rotation speed and with a low engine load factor in the permitted operation area may be set as a specific area. In this case, the execution device may be configured to perform the specific cylinder fuel cutoff process when the operation state of the internal combustion engine is not included in the specific area and the operation state of the internal combustion engine is included in the permitted operation area in a state in which the fastening force has been decreased through the first fastening force decreasing process. The execution device may be configured to start the specific cylinder fuel cutoff process in a state in which the fastening force has been decreased through the second fastening force decreasing process when the operation state of the internal combustion engine is included in the specific area.

When the internal combustion engine is operating with a load and when the engine rotation speed is relatively high and the engine load factor is low, the vehicle body is less likely to vibrate even if the output torque of the internal combustion engine fluctuates. Accordingly, with this configuration, the second fastening force decreasing process is performed instead of the first fastening force decreasing process when the operation state of the internal combustion engine is included in the specific area. The specific cylinder fuel cutoff process is performed in a state in which the fastening force of the lockup clutch has been decreased through the second fastening force decreasing process. That is, it is possible to curb vibration of the vehicle body due to execution of the specific cylinder fuel cutoff process while curbing a decrease in efficiency for transmitting the output torque of the internal combustion engine to vehicle wheels.

In the control device for a vehicle according to the aspect, the execution device may be configured to, when the operation state of the internal combustion engine is not included in the permitted operation area even after decreasing the fastening force through the fastening force decreasing process, control at least one of the internal combustion engine and the gear shift device such that the operation state of the internal combustion engine is included in the permitted operation area and to start the specific cylinder fuel cutoff process when the operation state of the internal combustion engine is included in the permitted operation area.

The specific cylinder fuel cutoff process cannot be performed when the fastening force of the lockup clutch has been decreased through the fastening force decreasing process and the operation state of the internal combustion engine is not included in the permitted operation area. Therefore, with this configuration, at least one of the internal combustion engine and the gear shift device is controlled such that the operation state of the internal combustion engine is included in the permitted operation area when the operation state of the internal combustion engine is not included in the permitted operation area even after decreasing the fastening force of the lockup clutch through the fastening force decreasing process. When the operation state of the internal combustion engine is included in the permitted operation area through such control, the specific cylinder fuel cutoff process is performed. Accordingly, it is possible to increase opportunities to perform the specific cylinder fuel cutoff process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, a control device for a vehicle according to a first embodiment will be described with reference to FIGS. 1 to 4.

Overall Configuration

Figure 1:
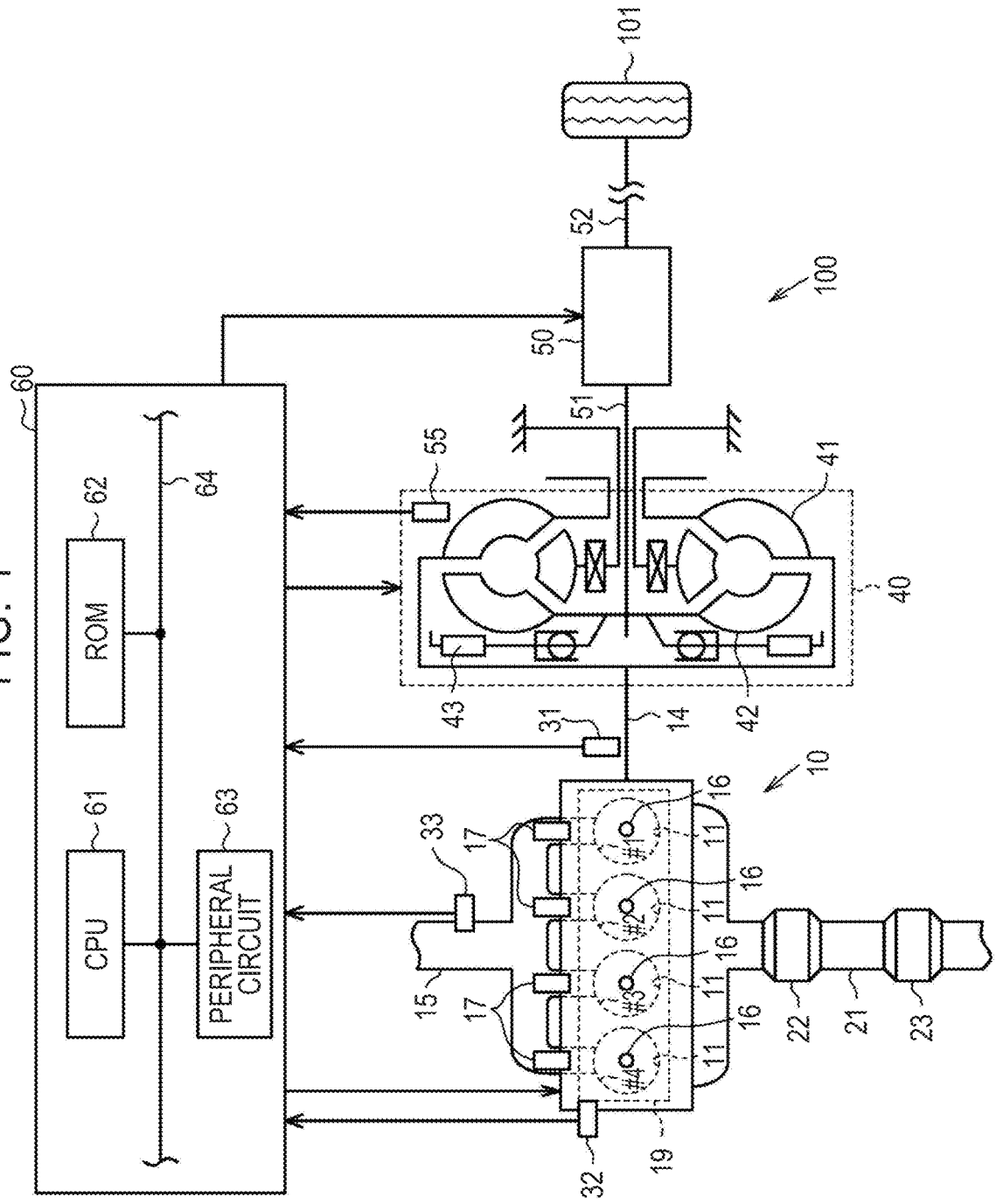
FIG. 1 is a diagram schematically illustrating a configuration of a vehicle to which a control device for a vehicle according to a first embodiment is applied.

FIG. 1 illustrates a vehicle 100 to which a control device 60 according to this embodiment is applied. The vehicle 100 includes an internal combustion engine 10, a torque converter 40, and a gear shift device 50. A torque output from the internal combustion engine 10 is input to the gear shift device 50 via the torque converter 40. A torque output from the gear shift device 50 is input to driving wheels 101.

Configuration of Internal Combustion Engine 10

The internal combustion engine 10 includes a plurality of cylinders 11. In the example illustrated in FIG. 1, the number of cylinders in the internal combustion engine 10 is four. In the following description, the cylinders 11 of the internal combustion engine 10 are referred to by cylinder numbers such as a first cylinder #1, a second cylinder #2, a third cylinder #3, and a fourth cylinder #4 in the order of arrangement thereof.

A piston is provided in each cylinder 11. In each cylinder 11, the piston can reciprocate. The piston in each cylinder 11 is connected to a crank shaft 14 via a connecting rod. The crank shaft 14 rotates with reciprocation of the pistons in the cylinders 11.

The internal combustion engine 10 includes a water jacket 19. The water jacket 19 is a passage in which a coolant for cooling the internal combustion engine 10 flows. The internal combustion engine 10 includes the same number of ignition plugs 16 as the number of cylinders. That is, one of the ignition plugs 16 is provided in each cylinder 11. In each cylinder 11, the corresponding ignition plug 16 ignites an air-fuel mixture including intake air and fuel by spark discharge. In one combustion cycle of the internal combustion engine 10, ignition of an air-fuel mixture is performed in the order of the first cylinder #1, the third cylinder #3, the fourth cylinder #4, and the second cylinder #2.

The internal combustion engine 10 includes an intake air passage 15 that supplies intake air to the cylinders 11 and a plurality of fuel injection valves 17. The intake air passage 15 is connected to the cylinders 11. The fuel injection valve 17 is provided in each cylinder 11. Fuel injected from the fuel injection valve 17 is supplied to the corresponding cylinder 11.

The internal combustion engine 10 includes an exhaust gas passage 21 in which exhaust gas discharged from the cylinders 11 flows. The exhaust gas passage 21 is connected to the cylinders 11. A three-way catalyst 22 is provided in the exhaust gas passage 21. The three-way catalyst 22 has an oxygen storage capacity. Accordingly, the three-way catalyst 22 can clean the exhaust gas. A gasoline particulate filter 23 is disposed downstream from the three-way catalyst 22 in the exhaust gas passage 21. The gasoline particulate filter 23 captures particulate matter included in the exhaust gas. In the following description, the gasoline particulate filter is referred to as a "GPF." The particulate matter is referred to as "PM."

The internal combustion engine 10 includes a plurality of types of sensors. Examples of the sensors include a crank angle sensor 31, a coolant temperature sensor 32, and an air flowmeter 33. The crank angle sensor 31 outputs a signal corresponding to an engine rotation speed NE which is a rotation speed of the crank shaft 14 as a detection signal to the control device 60. The coolant temperature sensor 32 detects a coolant temperature THW which is a temperature of a coolant circulating in the water jacket 19 and outputs a detection signal corresponding to the detection result to the control device 60. The air flowmeter 33 detects an amount of intake air GA which is a flow rate of intake air flowing in the intake air passage 15 and outputs a detection signal corresponding to the detection result to the control device 60.

Configuration of Torque Converter 40 and Gear Shift Device 50

The torque converter 40 includes a pump impeller 41 to which the crank shaft 14 is connected and a turbine impeller 42 to which an input shaft 51 of the gear shift device 50 is connected. In the torque converter 40, torque is transmitted between the pump impeller 41 and the turbine impeller 42 via a fluid.

The torque converter 40 includes a lockup clutch 43. In the torque converter 40, an operation state of the lockup clutch 43 can be switched between an engaged state in which the pump impeller 41 and the turbine impeller 42 are directly connected and a disengaged state in which the engaged state is completely released. The operation state of the lockup clutch 43 can be changed by supplying a fluid into the torque converter 40. When the operation state of the lockup clutch 43 is the engaged state, the output torque of the internal combustion engine 10 is transmitted to the gear shift device 50 via the lockup clutch 43. On the other hand, when the operation state of the lockup clutch 43 is the disengaged state, the output torque of the internal combustion engine 10 is transmitted to the gear shift device 50 via a fluid in the torque converter 40.

In this embodiment, even when the operation state of the lockup clutch 43 is the engaged state, a fastening force FF can be changed. In this case, as the fastening force FF decreases, torque transmission efficiency of the lockup clutch 43 decreases. This adjustment of the fastening force FF can be realized by controlling supply of a fluid into the torque converter 40.

The gear shift device 50 includes an input shaft 51 to which a torque from the torque converter 40 is input and an output shaft 52 that outputs a torque. A gear shift ratio of the gear shift device 50 can be adjusted through the control of the control device 60.

The gear shift device 50 includes a fluid temperature sensor 55 that detects a fluid temperature THF which is a temperature of a fluid circulating in the gear shift device 50 and the torque converter 40. The fluid temperature sensor 55 outputs a detection signal corresponding to the detected fluid temperature THF to the control device 60.

Configuration of Control Device 60

The control device 60 controls the internal combustion engine 10. That is, the control device 60 operates various operation units in the internal combustion engine 10 such as the fuel injection valves 17 and the ignition plugs 16 to operate the internal combustion engine 10. The control device 60 controls control values of the operation units of the internal combustion engine 10 with reference to an amount of intake air GA, an engine rotation speed NE, an engine load factor KL, and a coolant temperature THW. The engine load factor KL is a parameter for determining an amount of air with which a combustion engine of each cylinder 11 is filled. The engine load factor KL is, for example, a ratio of an amount of intake air per combustion cycle of one cylinder to a reference amount of intake air. The reference amount of intake air is set to be variable according to the engine rotation speed NE.

The control device 60 controls the torque converter 40 and the gear shift device 50. That is, the control device 60 controls an operation state of the lockup clutch 43. For example, when the operation state is the engaged state, the control device 60 may adjust the fastening force FF of the lockup clutch 43. The control device 60 controls the gear shift ratio of the gear shift device 50 based on a vehicle speed SP which is a moving speed of the vehicle 100 or the like.

The control device 60 includes a CPU 61, a ROM 62, and a peripheral circuit 63. In the control device 60, the CPU 61, the ROM 62, and the peripheral circuit 63 can communicate with each other via a communication line 64. The peripheral circuit 63 includes a circuit that generates a clock signal for defining an internal operation, a power supply circuit, and a reset circuit. The control device 60 controls the control values by causing the CPU 61 to execute a program stored in the ROM 62. In this embodiment, the CPU 61 corresponds to an "execution device" that performs a specific cylinder fuel cutoff process and a fastening force decreasing process which will be described later.

Specific Cylinder Fuel Cutoff Process

The CPU 61 of the control device 60 performs a specific cylinder fuel cutoff process when the internal combustion engine 10 operates with a load. In the specific cylinder fuel cutoff process, the CPU 61 operates the internal combustion engine 10 such that supply of fuel to some cylinders 11 of the plurality of cylinders 11 is stopped and supply of fuel to the other cylinders 11 is maintained. A cylinder 11 to which supply of fuel is stopped is referred to as a "stopped cylinder," and a cylinder 11 to which supply of fuel is maintained is referred to as a "supplied cylinder." At this time, in the specific cylinder fuel cutoff process, the CPU 61 stops injection of fuel from the fuel injection valve 17 corresponding to the stopped cylinder and maintains injection of fuel from the fuel injection valve 17 corresponding to the supplied cylinder. For example, the CPU 61 increases an amount of fuel injected from the fuel injection valve 17 corresponding to the supplied cylinder such that an air-fuel ratio of an air-fuel mixture in the supplied cylinder is richer than a stoichiometric air-fuel ratio.

The CPU 61 performs the specific cylinder fuel cutoff process when the internal combustion engine 10 operates with a load in order to supply oxygen to the three-way catalyst 22 or the GPF 23. When the specific cylinder fuel cutoff process is performed, supply of fuel to the stopped cylinder is stopped and supply of fuel to the supplied cylinder is maintained, whereby the output torque of the internal combustion engine 10 fluctuates. Accordingly, when the specific cylinder fuel cutoff process is performed while the internal combustion engine 10 is operating with a load, the amplitude of the fluctuation of the output torque of the internal combustion engine 10 is large and thus there is concern about a vehicle body of the vehicle 100 vibrating heavily.

Figure 2:
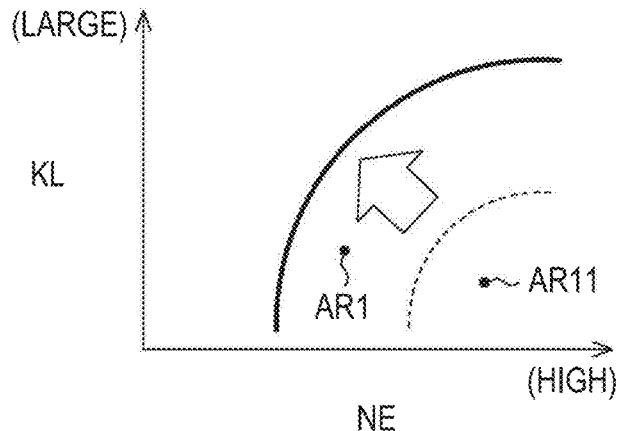
FIG. 2 is a diagram illustrating a permitted operation area and a specific area.

Accordingly, in the related art, when the internal combustion engine 10 operates with a load and the operation state of the internal combustion engine 10 is included in a specific area AR11 indicated by a dotted line in FIG. 2, the specific cylinder fuel cutoff process is performed. The specific area AR11 is an operation area of the internal combustion engine 10 in which the engine rotation speed NE is high and the engine load factor KL is low.

On the other hand, in this embodiment, the control device 60 controls the torque converter 40 such that opportunities to perform the specific cylinder fuel cutoff process are increased.

Flow of Processes Performed by CPU 61 of Control Device 60

Figure 3:
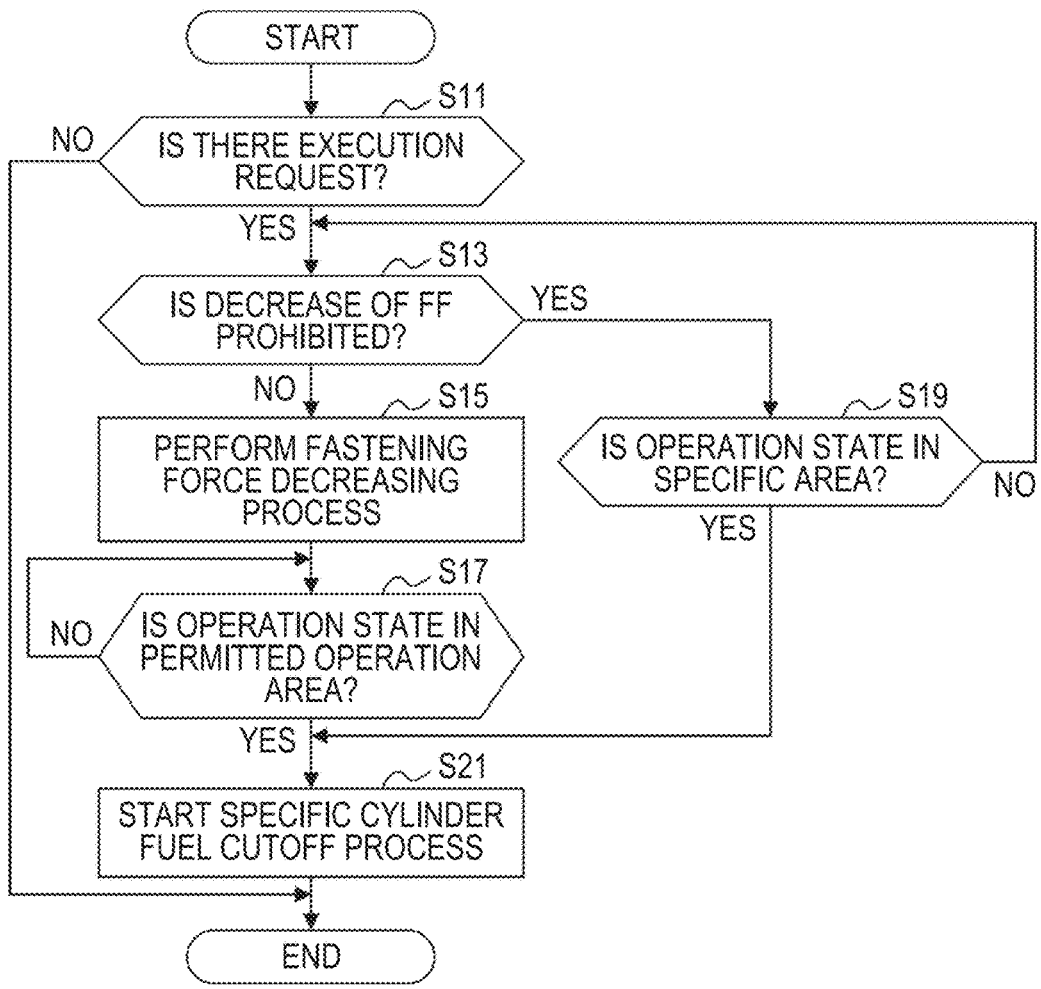
FIG. 3 is a flowchart illustrating a flow of processes which are performed by a CPU of the control device.

A flow of processes which are performed by the CPU 61 in order to perform the specific cylinder fuel cutoff process when the internal combustion engine 10 is operating with a load will be described below with reference to FIGS. 2 and 3. The flow of processes illustrated in FIG. 3 is realized by causing the CPU 61 to execute a program stored in the ROM 62.

In the flow of processes, first, in Step S11, the CPU 61 determines whether there is an execution request for a specific cylinder fuel cutoff process. When it is necessary to supply oxygen to the three-way catalyst 22 or the GPF 23, it can be considered that there is an execution request. On the other hand, when it is not necessary to supply oxygen to the three-way catalyst 22 or the GPF 23, it can be considered that there is no execution request. For example, when an amount of PM deposited in the GPF 23 is equal to or greater than a threshold value, it is necessary to supply oxygen to the GPF 23 in order to increase the temperature of the GPF 23 or to combust PM in the GPF 23. When there is no execution request (S11: NO), the CPU 61 temporarily ends the flow of processes. On the other hand, when there is an execution request (S11: YES), the CPU 61 causes the flow of processes to proceed to Step S13.

In Step S13, the CPU 61 determines whether decrease of the fastening force FF of the lockup clutch 43 is prohibited. In this embodiment, when the operation state of the lockup clutch 43 is changed, supply of a fluid to the torque converter 40 is adjusted. At this time, when the temperature of the fluid is excessively high, changing of the operation state of the lockup clutch 43 is prohibited. For example, when the fluid temperature THF is equal to or higher than a fluid temperature determination value, it can be considered that the fluid temperature THF is too high to decrease the fastening force FF. Accordingly, when the fluid temperature THF is equal to or higher than the fluid temperature determination value, it can be determined that decrease of the fastening force FF is prohibited. On the other hand, when the fluid temperature THF is lower than the fluid temperature determination value, it is determined that decrease of the fastening force FF is not prohibited.

When it is determined in Step S13 that decrease of the fastening force FF is not prohibited (NO), the CPU 61 causes the flow of processes to proceed to Step S15. In Step S15, the CPU 61 performs a fastening force decreasing process of decreasing the fastening force FF. For example, in the fastening force decreasing process, the CPU 61 switches the operation state of the lockup clutch 43 to a disengaged state. In this case, it can be said that the CPU 61 has decreased the fastening force FF until the fastening force FF is "0."

When the fastening force FF has been decreased through the fastening force decreasing process, the CPU 61 causes the flow of processes to proceed to Step S17. In Step S17, the CPU 61 determines whether the operation state of the internal combustion engine 10 is included in a permitted operation area AR1. When the operation state of the internal combustion engine 10 is not included in the permitted operation area AR1 (S17: NO), the CPU 61 repeatedly performs determination of Step S17 until the operation state is included in the permitted operation area AR1. On the other hand, when the operation state is included in the permitted operation area AR1 (S17: YES), the CPU 61 causes the flow of processes to proceed to Step S21.

The permitted operation area AR1 will be described below with reference to FIG. 2. As indicated by an outlined arrow in FIG. 2, the permitted operation area AR1 is an area obtained by enlarging the specific area AR11 to a side on which the engine rotation speed NE is low and a side on which the engine load factor KL is large. In this embodiment, the permitted operation area AR1 includes the specific area AR11. Specifically, an area with a high engine rotation speed NE and a low engine load factor KL in the permitted operation area AR1 is the specific area AR11.

When the specific cylinder fuel cutoff process is performed, the output torque of the internal combustion engine 10 fluctuates and thus the vehicle body may vibrate. In this embodiment, an operation area in which the amplitude of vibration of the vehicle body generated when the specific cylinder fuel cutoff process is performed in a state in which the fastening force FF of the lockup clutch 43 has been decreased through the fastening force decreasing process can be curbed in an allowable range is set as the permitted operation area AR1. Accordingly, when a point indicating the engine rotation speed NE and the engine load factor KL at the current time is in the permitted operation area AR1 in the graph illustrated in FIG. 2, it can be determined that the operation state of the internal combustion engine 10 is included in the permitted operation area AR1.

Referring back to FIG. 3, when it is determined in Step S13 that decrease of the fastening force FF is prohibited (YES), the CPU 61 causes the flow of processes to proceed to Step S19. In Step S19, the CPU 61 determines whether the operation state of the internal combustion engine 10 is included in the specific area AR11. When the operation state of the internal combustion engine 10 is not included in the specific area AR11 (S19: NO), the CPU 61 causes the flow of processes to proceed to Step S13. On the other hand, when the operation state is included in the specific area AR11 (S19: YES), the CPU 61 causes the flow of processes to proceed to Step S21.

In Step S21, the CPU 61 starts the specific cylinder fuel cutoff process. Then, the CPU 61 ends the flow of processes. When predetermined ending conditions are satisfied, the CPU 61 ends the specific cylinder fuel cutoff process. For example, when it is determined that a sufficient amount of oxygen has been able to be supplied to the three-way catalyst 22 or the GPF 23, the CPU 61 determines that predetermined ending conditions have been satisfied and ends the specific cylinder fuel cutoff process.

Operations and Advantages of Embodiment

Figure 4:
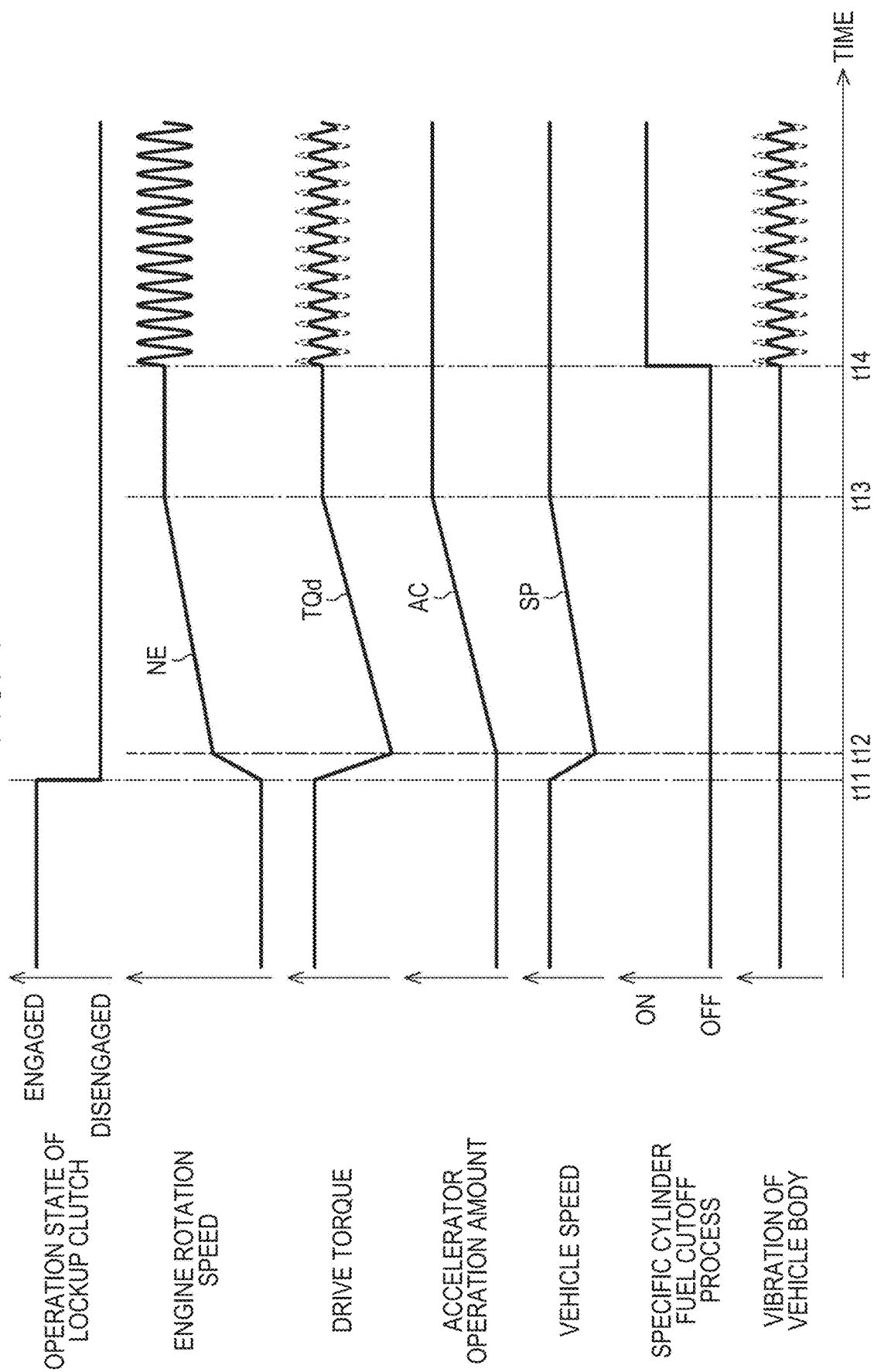
FIG. 4 is a timing chart illustrating a specific cylinder fuel cutoff process which is performed when an internal combustion engine is operating with a load.

In the example illustrated in FIG. 4, it is requested to perform the specific cylinder fuel cutoff process at a timing t11 while the internal combustion engine 10 is operating with a load. Then, the operation state of the lockup clutch 43 is switched from the engaged state to the disengaged state through the fastening force decreasing process. That is, the fastening force FF of the lockup clutch 43 is decreased. Accordingly, the engine rotation speed NE is increased even when the accelerator operation amount AC is maintained. This is because a load acting on the internal combustion engine 10 is decreased by switching the operation state of the lockup clutch 43 to the disengaged state.

In the example illustrated in FIG. 4, at timing t11, the operation state of the internal combustion engine 10 is not included in the permitted operation area AR1. In addition, even when the fastening force FF is decreased through the fastening force decreasing process, the operation state of the internal combustion engine 10 is not included in the permitted operation area AR1. Accordingly, at a timing t12 at which the fastening force FF has been decreased through the fastening force decreasing process, the specific cylinder fuel cutoff process is not started.

When the operation state of the lockup clutch 43 is switched to the disengaged state, the torque transmission efficiency of the torque converter 40 is decreased. Accordingly, a drive torque TQd which is input to driving wheels 101 is decreased. Then, the vehicle speed SP decreases. In the example illustrated in FIG. 4, the accelerator operation amount AC is increased by a driver of the vehicle 100. The engine rotation speed NE increases as the accelerator operation amount AC increases. When the vehicle speed SP increases to a value before the fastening force decreasing process is started, the driver maintains the accelerator operation amount AC as illustrated at a timing t13.

In the example illustrated in FIG. 4, it is determined that the operation state of the internal combustion engine 10 is included in the permitted operation area AR1 at a subsequent timing t14. Accordingly, the specific cylinder fuel cutoff process is started. That is, an engine operation of stopping supply of fuel to some cylinders 11 out of a plurality of cylinders 11 and maintaining supply of fuel to the other cylinders 11 is started. Then, the output torque of the internal combustion engine 10 fluctuates. In this case, the engine rotation speed NE also fluctuates in a cycle corresponding to the fluctuation of the output torque. As a result, since the drive torque TQd input to the driving wheels 101 fluctuates, the vehicle body also vibrates.

In FIG. 4, fluctuation of the drive torque TQd and vibration of the vehicle body in this embodiment are indicated by solid lines. On the other hand, fluctuation of the drive torque TQd and vibration of the vehicle body in a comparative example are indicated by dotted lines. The comparative example is an example in which the specific cylinder fuel cutoff process is performed without performing the fastening force decreasing process.

By decreasing the fastening force FF of the lockup clutch 43 through the fastening force decreasing process, the torque transmission efficiency of the torque converter 40 is decreased. In this embodiment, the specific cylinder fuel cutoff process is performed in a state in which the fastening force FF has been decreased. Accordingly, even when the output torque of the internal combustion engine 10 fluctuates due to execution of the specific cylinder fuel cutoff process, the fluctuation is attenuated and transmitted to the gear shift device 50. As a result, the amplitude of fluctuation of the drive torque TQd which is input to the driving wheels 101 decreases. Accordingly, when the specific cylinder fuel cutoff process is performed in a state in which the internal combustion engine 10 is operating with a load, it is possible to curb vibration of the vehicle body of the vehicle 100 in comparison with that in the comparative example.

Although the operation state of the internal combustion engine 10 is not included in the permitted operation area AR1 before the fastening force decreasing process is performed, the engine rotation speed NE and the engine load factor KL may change and the operation state may be included in the permitted operation area AR1 when the fastening force FF is decreased through the fastening force decreasing process. In this case, the specific cylinder fuel cutoff process is performed even when the accelerator operation amount AC is not increased after the fastening force decreasing process has been performed.

Even when the operation state of the internal combustion engine 10 is included in the permitted operation area AR1 before the fastening force decreasing process is performed, the fastening force FF is decreased through the fastening force decreasing process. Even if the engine rotation speed NE and the engine load factor KL change, the specific cylinder fuel cutoff process is performed when the operation state is included in the permitted operation area AR1.

According to this embodiment, the following advantages can be additionally achieved. (1-1) In this embodiment, the operation state of the lockup clutch 43 is switched to the disengaged state through the fastening force decreasing process. Accordingly, in comparison with a case in which the fastening force FF is decreased and the operation state is not switched to the disengaged state, fluctuation of the output torque of the internal combustion engine 10 is further attenuated and transmitted to the driving wheels 101. Accordingly, it is possible to further curb vibration of the vehicle body.

(1-2) When the fluid temperature THF increases in a state in which the operation state of the lockup clutch 43 is the engaged state, decrease of the fastening force FF may be prohibited. In this case, when it is requested to perform the specific cylinder fuel cutoff process, the fastening force decreasing process cannot be performed.

In this regard, according to this embodiment, the specific cylinder fuel cutoff process is performed based on the premise that the operation state of the internal combustion engine 10 is included in the specific area AR11 when it is requested to perform the specific cylinder fuel cutoff process in a state in which decrease of the fastening force FF is prohibited. Accordingly, it is possible to increase opportunities to perform the specific cylinder fuel cutoff process while curbing vibration of the vehicle body due to execution of the specific cylinder fuel cutoff process.

(1-3) The specific area AR11 can be said to be a permitted operation area in the related art in which the fastening force decreasing process is not performed before the specific cylinder fuel cutoff process is performed. In this embodiment, since the fastening force decreasing process is performed before the specific cylinder fuel cutoff process is performed, it is possible to further enlarge the permitted operation area in comparison with the related art. As a result, it is possible to increase opportunities to perform the specific cylinder fuel cutoff process when the internal combustion engine 10 is operating with a load.

Second Embodiment

Figure 5:
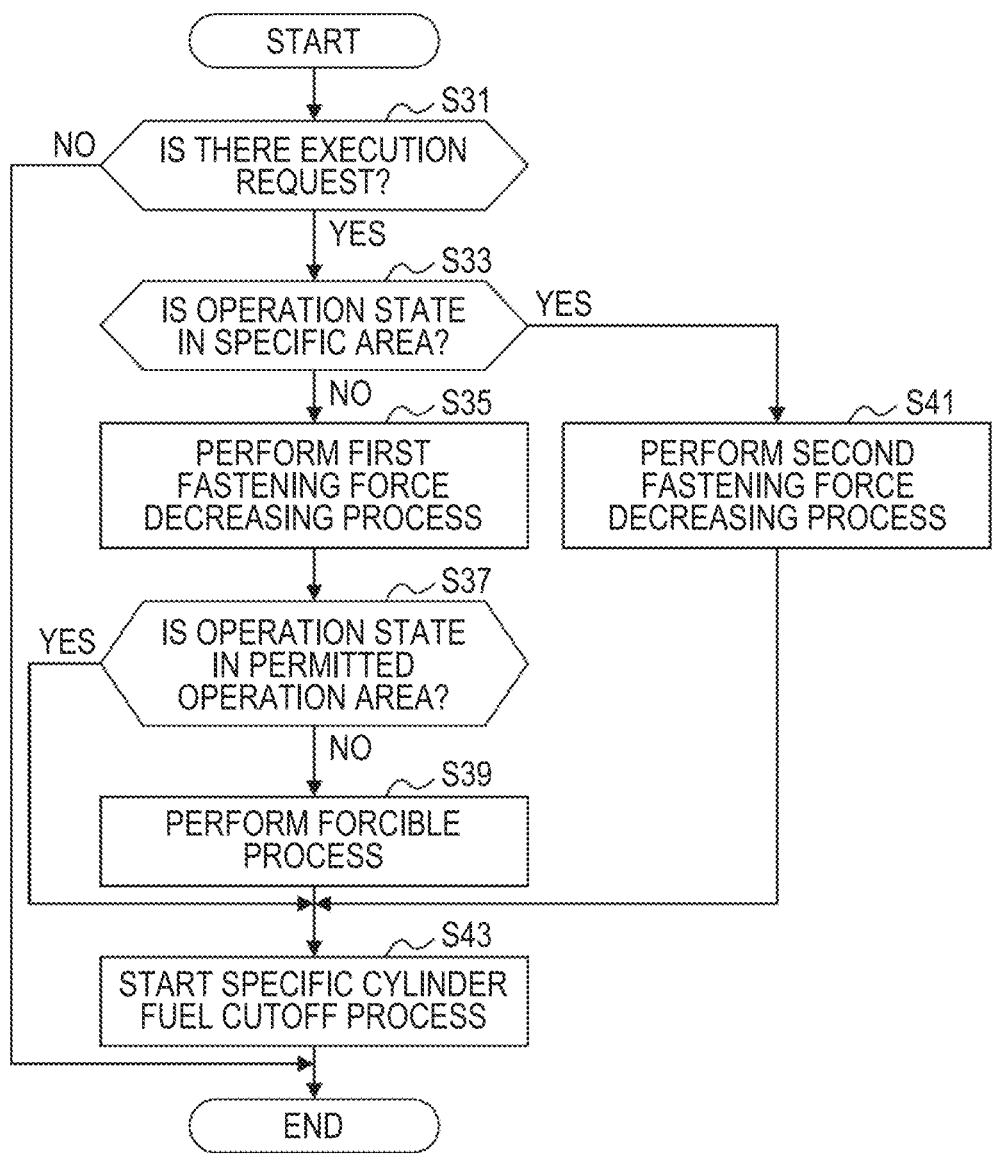
FIG. 5 is a flowchart illustrating a flow of processes which are performed by a CPU of a control device for a vehicle according to a second embodiment.

A control device for a vehicle according to a second embodiment will be described below with reference to FIG. 5. In the following description, differences from the first embodiment will be described, the same constituent elements as in the first embodiment or corresponding thereto will be referred to by the same reference signs, and description thereof will not be repeated.

A flow of processes which are performed by the CPU 61 in order to perform a specific cylinder fuel cutoff process when the internal combustion engine 10 is operating with a load will be described below with reference to FIG. 5. The flow of processes illustrated in FIG. 5 is realized by causing the CPU 61 to execute a program stored in the ROM 62.

In the flow of processes, first, in Step S31, the CPU 61 determines whether there is an execution request for the specific cylinder fuel cutoff process similarly to Step S11. When there is no execution request (S31: NO), the CPU 61 temporarily ends the flow of processes. On the other hand, when there is an execution request (S31: YES), the CPU 61 causes the flow of processes to proceed to Step S33.

In Step S33, the CPU 61 determines whether the operation state of the internal combustion engine 10 is included in the specific area AR11. When the operation state of the internal combustion engine 10 is not included in the specific area AR11 (S33: NO), the CPU 61 causes the flow of processes to proceed to Step S35. In Step S35, the CPU 61 performs a first fastening force decreasing process. The first fastening force decreasing process is a process of decreasing the fastening force FF of the lockup clutch 43. In this embodiment, the CPU 61 decreases the fastening force FF until the operation state of the lockup clutch 43 becomes the disengaged state in the first fastening force decreasing process.

When the fastening force FF is decreased through the first fastening force decreasing process, the CPU 61 causes the flow of processes to proceed to Step S37. In Step S37, the CPU 61 determines whether the operation state of the internal combustion engine 10 is included in the permitted operation area AR1. When the operation state is included in the permitted operation area AR1 (S37: YES), the CPU 61 causes the flow of processes to proceed to Step S43. On the other hand, when the operation state is not included in the permitted operation area AR1 (S37: NO), the CPU 61 causes the flow of processes to proceed to Step S39.

In Step S39, the CPU 61 performs a forcible process of controlling at least one of the internal combustion engine 10 and the gear shift device 50 such that the operation state of the internal combustion engine 10 is included in the permitted operation area AR1. The CPU 61 can adjust an output torque of the internal combustion engine 10 and a gear shift ratio of the gear shift device 50 such that fluctuation of the vehicle speed SP due to execution of the forcible process is curbed as much as possible. When the operation state of the internal combustion engine 10 is included in the permitted operation area AR1 through the forcible process, the CPU 61 causes the flow of processes to proceed to Step S43.

On the other hand, when it is determined in Step S33 that the operation state of the internal combustion engine 10 is included in the specific area AR11 (YES), the CPU 61 causes the flow of processes to proceed to Step S41. In Step S41, the CPU 61 performs a second fastening force decreasing process. That is, the CPU 61 can also perform the second fastening force decreasing process in addition to the first fastening force decreasing process. The second fastening force decreasing process is a process of decreasing the fastening force of the lockup clutch 43. Specifically, the second fastening force decreasing process is a process of decreasing the fastening force FF at a rate of decrease of the fastening force FF which is lower than that in the first fastening force decreasing process. In this embodiment, even when the second fastening force decreasing process is performed, the operation state of the lockup clutch 43 is not switched to the disengaged state. When the fastening force FF is decreased through the second fastening force decreasing process, the CPU 61 causes the flow of processes to proceed to Step S43.

In Step S43, the CPU 61 starts the specific cylinder fuel cutoff process. Then, the CPU 61 ends the flow of processes.

Operations and Advantages of Embodiment

According to this embodiment, the following advantages can be achieved.

(2-1) When the operation state of the internal combustion engine 10 is included in the specific area AR11, the second fastening force decreasing process is performed instead of the first fastening force decreasing process. In this case, the fastening force FF is greater than that when the first fastening force decreasing process is performed. In this state, the specific cylinder fuel cutoff process is performed. That is, the specific cylinder fuel cutoff process is performed with higher torque transmission efficiency of the torque converter 40 in comparison with a case in which the first fastening force decreasing process is performed. As a result, it is possible to curb vibration of the vehicle body due to execution of the specific cylinder fuel cutoff process while curbing decrease in efficiency of transmitting the output torque of the internal combustion engine 10 to the driving wheels 101.

(2-2) In this embodiment, when the operation state of the internal combustion engine 10 is not included in the specific area AR11, the first fastening force decreasing process is performed. When the operation state is not included in the permitted operation area AR1 even if the fastening force FF of the lockup clutch 43 is decreased through the first fastening force decreasing process, the forcible process is performed. Accordingly, the output torque of the internal combustion engine 10 and the gear shift ratio of the gear shift device 50 change such that the operation state is included in the permitted operation area AR1. When the operation state is included in the permitted operation area AR1 through the forcible process, the specific cylinder fuel cutoff process is performed. Accordingly, it is possible to increase opportunities to perform the specific cylinder fuel cutoff process.

MODIFIED EXAMPLES

The aforementioned embodiments can be modified as follows. The aforementioned embodiments and the following modified examples can be combined with each other unless technical conflicts arise.

In the second embodiment, when decrease of the fastening force FF is prohibited, the specific cylinder fuel cutoff process may be performed without performing any of the first fastening force decreasing process and the second fastening force decreasing process based on the premise that the operation state of the internal combustion engine 10 is included in the specific area AR11.

In the first embodiment, when decrease of the fastening force FF is prohibited, execution of the specific cylinder fuel cutoff process may be prohibited regardless of the operation state of the internal combustion engine 10.

In the first embodiment, the fastening force decreasing process may be a process of not switching the operation state of the lockup clutch 43 to the disengaged state as long as the fastening force FF can be decreased. In the second embodiment, the first fastening force decreasing process may be a process of not switching the operation state of the lockup clutch 43 to the disengaged state as long as the fastening force FF can be decreased. The rate of decrease of the fastening force FF in performing the first fastening force decreasing process is set to be larger than the rate of decrease of the fastening force FF in performing the second fastening force decreasing process.

In the first embodiment, when the operation state of the internal combustion engine 10 is not included in the permitted operation area AR1 even if the fastening force FF is decreased through the fastening force decreasing process, a process of prompting a driver to increase the engine rotation speed NE by operating the vehicle may be performed.

Examples of the vehicle operation for increasing the engine rotation speed NE include an operation of increasing the accelerator operation amount AC and an operation of changing the gear shift ratio of the gear shift device 50 to a low-speed side.

In the second embodiment, when the operation state of the internal combustion engine 10 is not included in the permitted operation area AR1 even if the fastening force FF is decreased through the first fastening force decreasing process, the forcible process may not be performed. In this case, a process of prompting a driver to increase the engine rotation speed NE by causing the driver to drive the vehicle may be performed instead of the forcible process. Examples of the vehicle operation for increasing the engine rotation speed NE include an operation of increasing the accelerator operation amount AC and an operation of changing the gear shift ratio of the gear shift device 50 to a low-speed side.

In the second embodiment, both the internal combustion engine 10 and the gear shift device 50 are controlled in the forcible process, but the present disclosure is not limited thereto. In the forcible process, the gear shift ratio of the gear shift device 50 may not be changed as long as the output torque of the internal combustion engine 10 can be changed. On the other hand, in the forcible process, the output torque of the internal combustion engine 10 may not be changed as long as the gear shift ratio of the gear shift device 50 can be changed.

The control device 60 is not limited to a configuration including the CPU 61 and the ROM 62 and performing software processes. That is, the control device 60 may have one of the following configurations (a) to (c).

(a) The control device 60 includes one or more processors that perform various types of processes in accordance with a computer program. The processor includes a CPU and a memory such as a RAM and a ROM. The memory stores program codes or commands to cause the CPU to perform processes. The memory, that is, a computer-readable medium, includes all available media which can be accessed by a general-purpose or dedicated computer.

(b) The control device 60 includes one or more dedicated hardware circuits that perform various types of processes. Examples of the dedicated hardware circuit include application-specific integrated circuits, that is, an ASIC and an FPGA. ASIC is an abbreviation of "application-specific integrated circuit," and FPGA is an abbreviation of "field-programmable gate array."

(c) The control device 60 includes a processor that performs some of various types of processes in accordance with a computer program and a dedicated hardware circuit that performs other processes of the various types of processes.

An internal combustion engine may be different from the internal combustion engine 10 as long as it includes two or more cylinders. A vehicle to which the control device 60 is applied may have a configuration different from that of the vehicle 100 as long as it is a vehicle including the internal combustion engine 10 and the torque converter 40. For example, the control device 60 may be applied to a hybrid vehicle including an electric motor in addition to the internal combustion engine 10 as a drive source of a vehicle.

What is claimed is:

1. A control device for a vehicle that is applied to a vehicle which includes an internal combustion engine including a plurality of cylinders, a torque converter including a lockup clutch, and a gear shift device, the control device comprising:

an execution device configured to perform a specific cylinder fuel cutoff process of stopping supply of fuel to some cylinders out of the plurality of cylinders and maintaining supply of fuel to other cylinders of the plurality of cylinders to operate the internal combustion engine and a fastening force decreasing process of decreasing a fastening force of the lockup clutch, wherein the execution device is configured to, in a state in which the internal combustion engine operates with a load, start the specific cylinder fuel cutoff process after the fastening force has been decreased through the fastening force decreasing process.

2. The control device according to claim 1, wherein the execution device is configured to, after the fastening force has been decreased through the fastening force decreasing process and in response to that an operation state of the internal combustion engine is included in a predetermined permitted operation area, start the specific cylinder fuel cutoff process.

3. The control device according to claim 2, wherein an area with a high engine rotation speed and with a low engine load factor in the permitted operation area is set as a specific area, and wherein the execution device is configured to, in response to that the operation state of the internal combustion engine is included in the specific area in a state in which decreasing the fastening force of the lockup clutch is prohibited, start the specific cylinder fuel cutoff process without performing the fastening force decreasing process.

4. The control device according to claim 2, wherein the fastening force decreasing process is defined as a first fastening force decreasing process, wherein the execution device is further configured to perform a second fastening force decreasing process of decreasing the fastening force at a rate of decrease of the fastening force which is lower than that in the first fastening force decreasing process, wherein an area with a high engine rotation speed and with a low engine load factor in the permitted operation area is set as a specific area, and wherein the execution device is configured to:

in response to that (i) the operation state of the internal combustion engine is not included in the specific area and (ii) the operation state of the internal combustion engine is included in the permitted operation area and after the fastening force has been decreased through the first fastening force decreasing process, start the specific cylinder fuel cutoff process; and in response to that the operation state of the internal combustion engine is included in the specific area and after the fastening force has been decreased through the second fastening force decreasing process, start the specific cylinder fuel cutoff process.

5. The control device for the vehicle according to claim 2, wherein the execution device is configured to, in response to that the operation state of the internal combustion engine is not included in the permitted operation area even after decreasing the fastening force through the fastening force decreasing process, control at least one of the internal combustion engine or the gear shift device such that the operation state of the internal combustion engine is included in the permitted operation area; and start the specific cylinder fuel cutoff process in response to that the operation state of the internal combustion engine is included in the permitted operation area.

6. A control device for a vehicle which includes an internal combustion engine including a plurality of cylinders, a torque converter including a lockup clutch, and a gear shift device, the control device comprising:
an execution device configured to perform
a specific cylinder fuel cutoff process of stopping supply of fuel to some cylinders out of the plurality of cylinders and maintaining supply of fuel to other cylinders of the plurality of cylinders to operate the internal combustion engine and
a fastening force decreasing process of decreasing a fastening force of the lockup clutch,
wherein the execution device is configured to start the specific cylinder fuel cutoff process in a state in which the fastening force has been decreased through the fastening force decreasing process when the specific cylinder fuel cutoff process is performed in a state in which the internal combustion engine operates with a load,
wherein the execution device is configured to perform the specific cylinder fuel cutoff process when an operation state of the internal combustion engine is included in a predetermined permitted operation area in a state in which the fastening force has been decreased through the fastening force decreasing process,
wherein an area with a high engine rotation speed and with a low engine load factor in the permitted operation area is set as a specific area, and
wherein the execution device is configured to start the specific cylinder fuel cutoff process without performing the fastening force decreasing process based on a premise that the operation state of the internal combustion engine is included in the specific area in a state in which decreasing the fastening force of the lockup clutch is prohibited.

7. A control device for a vehicle which includes an internal combustion engine including a plurality of cylinders, a torque converter including a lockup clutch, and a gear shift device, the control device comprising:
an execution device configured to perform
a specific cylinder fuel cutoff process of stopping supply of fuel to some cylinders out of the plurality of cylinders and maintaining supply of fuel to other cylinders of the plurality of cylinders to operate the internal combustion engine and
a fastening force decreasing process of decreasing a fastening force of the lockup clutch,
wherein the execution device is configured to start the specific cylinder fuel cutoff process in a state in which the fastening force has been decreased through the fastening force decreasing process when the specific cylinder fuel cutoff process is performed in a state in which the internal combustion engine operates with a load,
wherein the execution device is configured to perform the specific cylinder fuel cutoff process when an operation state of the internal combustion engine is included in a predetermined permitted operation area in a state in which the fastening force has been decreased through the fastening force decreasing process, and
wherein the execution device is configured to, when the operation state of the internal combustion engine is not included in the permitted operation area even after decreasing the fastening force through the fastening force decreasing process:
control at least one of the internal combustion engine and the gear shift device such that the operation state of the internal combustion engine is included in the permitted operation area; and
start the specific cylinder fuel cutoff process when the operation state of the internal combustion engine is included in the permitted operation area.

* * * * *